US009405931B2

(12) United States Patent
Dandekar et al.

(10) Patent No.: US 9,405,931 B2
(45) Date of Patent: Aug. 2, 2016

(54) PROTECTED INFORMATION STREAM ALLOCATION USING A VIRTUALIZED PLATFORM

(75) Inventors: Shree Dandekar, Round Rock, TX (US); David Konetski, Austin, TX (US); Thomas Lanzoni, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 1301 days.

(21) Appl. No.: 12/270,921

(22) Filed: Nov. 14, 2008

(65) Prior Publication Data

US 2010/0125914 A1 May 20, 2010

(51) Int. Cl.
*G06F 7/04* (2006.01)
*G06F 21/62* (2013.01)

(52) U.S. Cl.
CPC .................................. *G06F 21/6281* (2013.01)

(58) Field of Classification Search
CPC ................................................. G06Q 20/1235
USPC ............................................. 726/26; 705/50
See application file for complete search history.

(56) References Cited

U.S. PATENT DOCUMENTS

| 7,707,578 B1* | 4/2010 | Zedlewski et al. ............. 718/102 |
| 2005/0114610 A1* | 5/2005 | Robinson ................ G06F 21/71 711/152 |
| 2006/0159109 A1 | 7/2006 | Lamkin et al. |
| 2007/0094468 A1 | 4/2007 | Haustein et al. |
| 2007/0094469 A1 | 4/2007 | Haustein et al. |
| 2007/0094470 A1 | 4/2007 | Haustein et al. |
| 2007/0106743 A1 | 5/2007 | Nicholson et al. |
| 2007/0150894 A1* | 6/2007 | Barsness et al. .............. 718/100 |
| 2007/0218444 A1 | 9/2007 | Konetski et al. |
| 2007/0250512 A1 | 10/2007 | Friedlander et al. |
| 2007/0261123 A1* | 11/2007 | Bade et al. ...................... 726/27 |
| 2009/0063806 A1* | 3/2009 | Logan et al. ................... 711/173 |
| 2009/0316889 A1* | 12/2009 | MacDonald ............ G06F 21/10 380/201 |
| 2010/0115621 A1* | 5/2010 | Staniford ............. H04L 63/1416 726/25 |
| 2011/0010714 A1* | 1/2011 | Powell et al. ..................... 718/1 |
| 2012/0227042 A1* | 9/2012 | Zedlewski ............ G06F 9/5027 718/1 |

OTHER PUBLICATIONS

David Konetski; Download and Burn to Rent System; Filed Feb. 26, 2008; U.S. Appl. No. 12/037,759.
Kevin Kettler and Shree A. Dandekar; Virtualization Based Personalizable Consumer Electronics Platform; Filed Jul. 14, 2008; U.S. Appl. No. 12/172,544.
Gary Huber, Kevin A. Kettler, Yuan-Chang Lo and William Dale Todd Nix; Modular Virtual Machine Server; Filed Jul. 31, 2008; U.S. Appl. No. 12/183,513.
Kettler, Kevin; Konetski, David; Dandekar, Shree A., U.S. Appl. No. 12/416,396, entitled "Method and Apparatus to Secure Contents on a Consumer Virtual Appliance" filed Apr. 1, 2009.
Curtis, William A.; Dandekar, Shree A., U.S. Appl. No. 12/423,164, entitled "Virtualization Based Conditional Access Tuner Module for Providing Secure Linear and Non-Linear Content Services" filed Apr. 14, 2009.

* cited by examiner

*Primary Examiner* — Charles C Agwumezie
(74) *Attorney, Agent, or Firm* — Haynes and Boone, LLP

(57) ABSTRACT

A protected stream manager includes one or more subsystems to receive a content stream in a virtual environment, obfuscate the content stream, and prioritize use of a processor to process the content stream.

22 Claims, 4 Drawing Sheets

PROTECTED INFORMATION STREAM ALLOCATION USING A VIRTUALIZED PLATFORM

BACKGROUND

The present disclosure relates generally to information handling systems, and more particularly to a protected information stream allocation using a virtualized platform using an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHS architecture platforms have traditionally followed a well defined development evolution based on the Win Tel/x86 architecture. FIG. 4 illustrates a prior art embodiment of an IHS architecture including applications, an operating system and graphics hardware. However, virtualization is a software technology that is rapidly transforming the information technology (IT) landscape and fundamentally changing the way that people handle information using IHSs. Broadly, virtualization is an ability to allow software applications/operating systems to operate on IHS hardware remotely, but as if it were local. This evolution has unique challenges when applying a virtualization architecture to small, mobile compact embedded (CE) devices.

Using virtualization systems in a CE device allows the ability for users to add features, applications or other capabilities to their IHS by adding virtual modules. In this way, the virtual modules enable the user to completely change the personality or functionality of the IHS. These virtual functionality modules generally share hardware resources. Security of data and content which flows into and out of these functional modules and guaranteed allocation of resources for resource heavy applications, are unique challenges to CE devices.

For example, challenges in offering a virtualization enabled CE device (e.g., one with Blu-ray or other video capabilities) include an issue of how to obfuscate the content stream coming from the video device. Another issue in offering a virtualization enabled CE device includes how to support multiple protected streams. In other words, if a user connects additional virtual machines that output a protected stream to the host, (e.g., gaming virtual machine), then there needs to be a way to protect the streams of content coming from the gaming virtual machine as well as the video device. Yet another issue in offering a virtualization enabled CE device includes how to allocate the appropriate graphics processor unit (GPU) resources to the video and the premium content virtual machines so they do not fight for resources of the IHS. A further issue in offering a virtualization enabled CE device includes how to message to the customer if resource re-prioritization is required. These issues illustrate problems with offering a virtualization enabled CE device.

Accordingly, it would be desirable to provide an improved protected information stream allocation using a virtualized platform absent the disadvantages discussed above.

SUMMARY

According to one embodiment, a protected stream manager includes one or more subsystems to receive a content stream in a virtual environment, obfuscate the content stream, and prioritize use of a processor to process the content stream.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
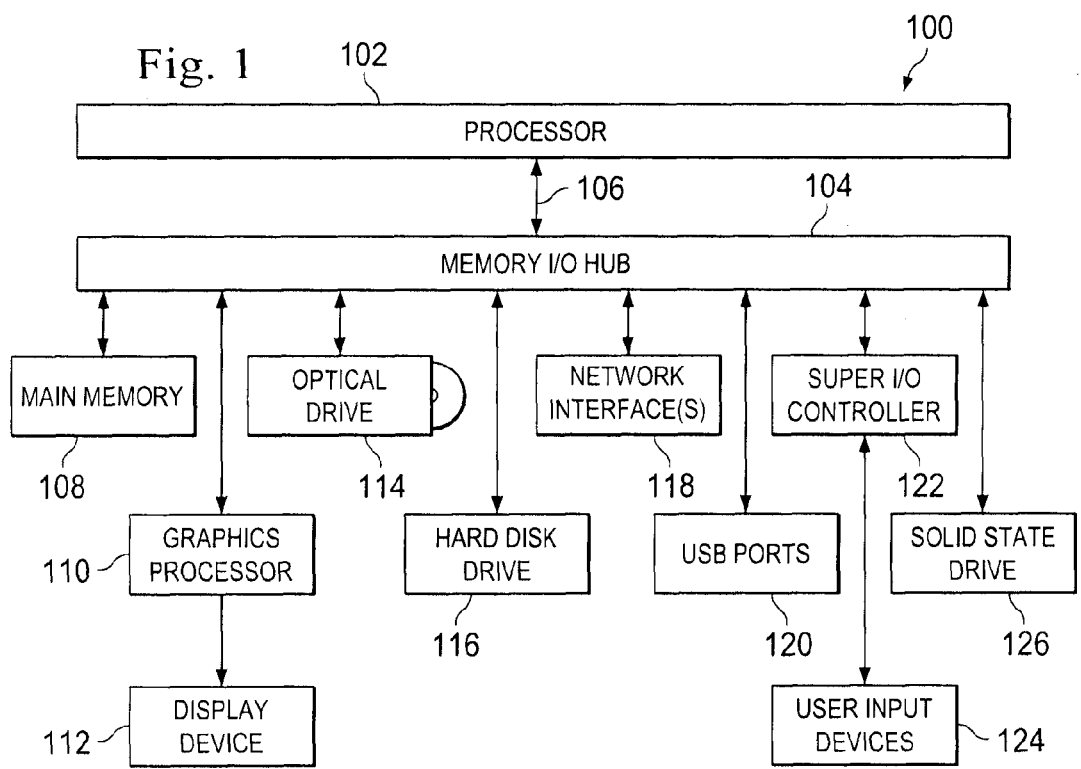
FIG. 1 illustrates a block diagram of an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor unit (GPU) 110 also connects to memory I/O hub 104, allowing the graphics processor to communicate, e.g., with processor 102 and main memory 108. Graphics processor unit 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
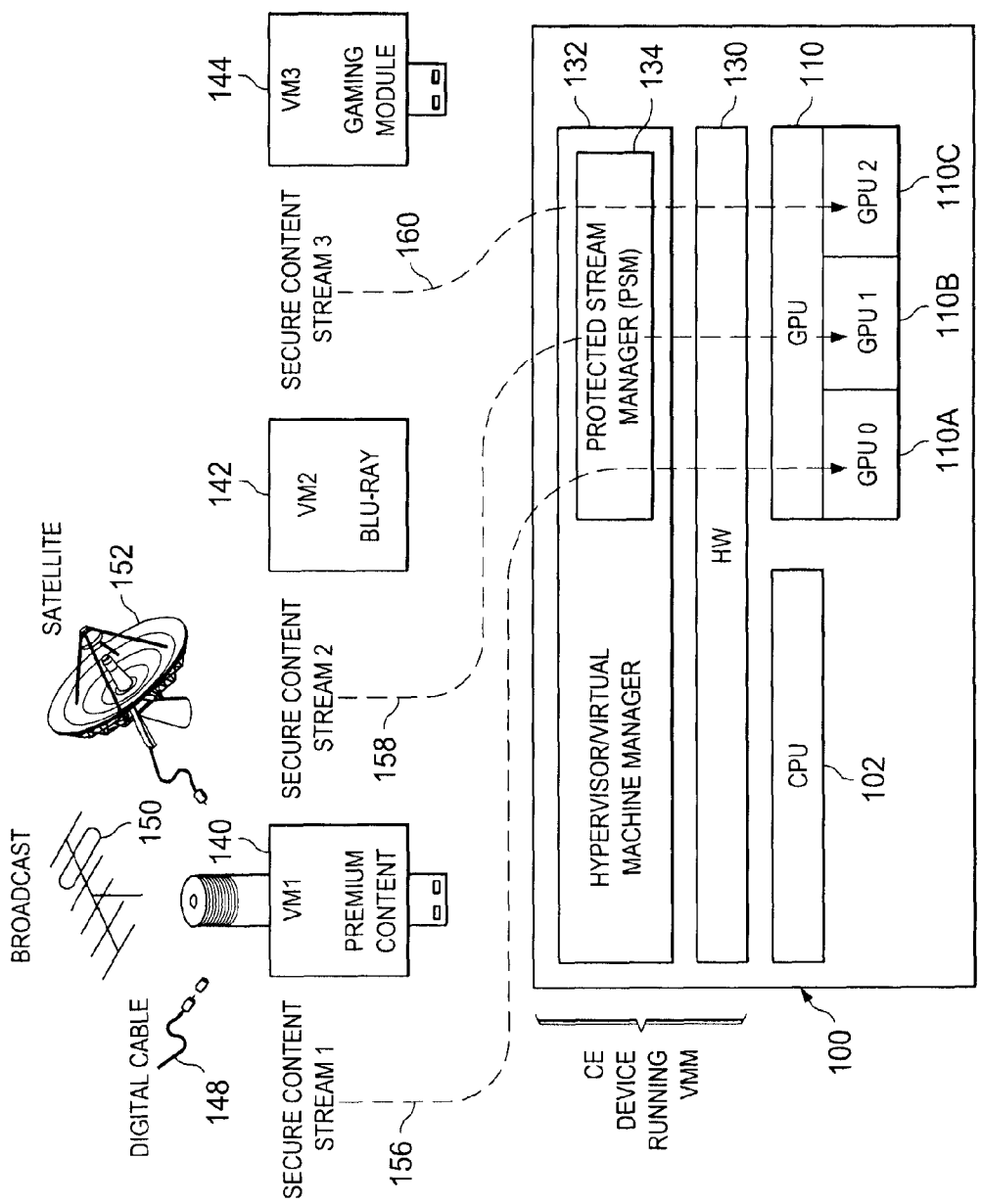
FIG. 2 illustrates a block diagram showing an overview of an embodiment of a protected stream manager (PSM).

FIG. 2 illustrates a block diagram showing an overview of an embodiment of a protected stream manager (PSM). The present disclosure will be discussed using graphical information/data, such as premium content video (e.g., cable, broadcast and satellite television), Blu-ray video and gaming. For example, the present disclosure may enable Blu-ray and premium protected content on a customizable, small business and/or consumer solution architecture IHS 100, which is built around a general purpose virtualized x86 architecture platform. In an embodiment, this is a key enabler for the IHS 100. However, it should be understood that the systems and methods of this disclosure may be utilized for any information stream, not just graphical data.

The IHS 100 shown in FIG. 2 includes IHS hardware 130 (e.g., one or more of the devices shown in FIG. 1), a processor 102, a GPU 110 and a hypervisor/virtual machine manager 132. The GPU 110 includes multiple GPU partitions 110A, 110B and 110C. The GPU partitions 110A, 110B and 110C may be software partitions of a single GPU 110, they may be separate and additional hardware GPUs, they may be separate GPU cores in a single GPU 100, and/or they may be any variety of configurations, hardware and/or software, that may be allocated for use by the hypervisor 132 and/or the GPU 110 and may be viewed as a single GPU 110. The hypervisor 132 includes a protected stream manager (PSM) 134 for controlling information to and from the GPUs 110A, 110B and 110C via the hardware 130 and the GPU 110. As shown in FIG. 2, the hypervisor 132, PSM 134 and the hardware 130 may be a small, mobile compact embedded CE device running a virtual machine manager. The PSM 134 may be built into the hypervisor 132, which may be embedded into firmware of the IHS 100.

Coupled with the IHS 100 are three virtual machine devices 140, 142 and 144. Any number of virtual machine devices may couple with the IHS 100. The virtual machines 140, 142 and 144 are designed to enable a "black box" device, such as the IHS 100, to change functions, including operating systems, hardware, and a variety of other features, when different virtual machines 140, 142 and 144 are coupled with the IHS 100. In an embodiment, the virtual machine 140 provides television signals, such as cable television 148, broadcast television 150, satellite television 152, or any other type of television to the IHS 100 via a secure content stream 156. In an embodiment, the virtual machine 142 provides Blu-ray or other high definition video signals to the IHS 100 via a secure content stream 158. In an embodiment, the virtual machine 144 provides gaming signals to the IHS 100 via a secure content stream 160. Each virtual machine 140, 142 and 144 may be an independent, isolated unit that may include its own version of an operating system running on the respective virtual machine 140, 142 and 144.

In an embodiment, the hypervisor 132 and the PSM 134 make resources available to the virtual machines 140, 142 and 144. Accordingly, the hypervisor 132 and the PSM 134 may prioritize the resources and time multiplex the resources so that each virtual machine 140, 142 and 144 thinks that it "owns" the GPU 110 or other processor. In other words, the PSM 134 allows each virtual machine 140, 142 and 144 to provide its content to the GPU 110 (110A, 110B and 110C, respectively) via the respective content stream 156, 158 and 160 so that each virtual machine 140, 142 and 144 appears to have ownership of the GPU 110.

Figure 3:
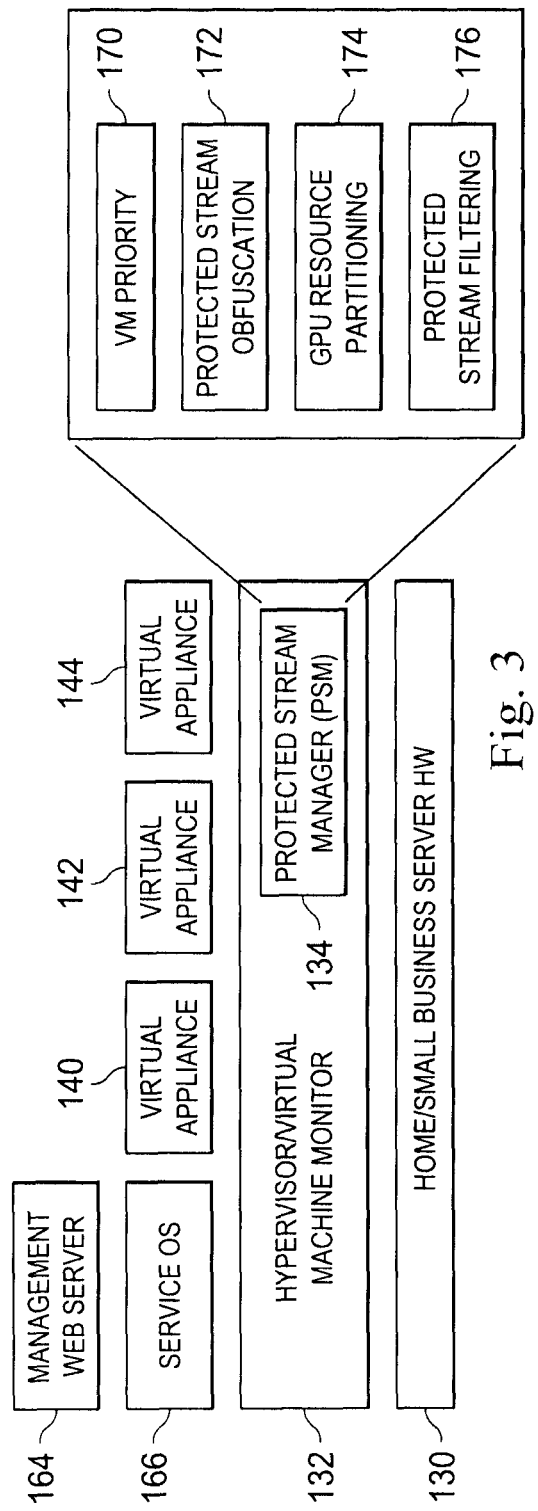
FIG. 3 illustrates a block diagram of an architecture overview for an embodiment of a hypervisor having a built-in protected stream manager (PSM).
Figure 4:
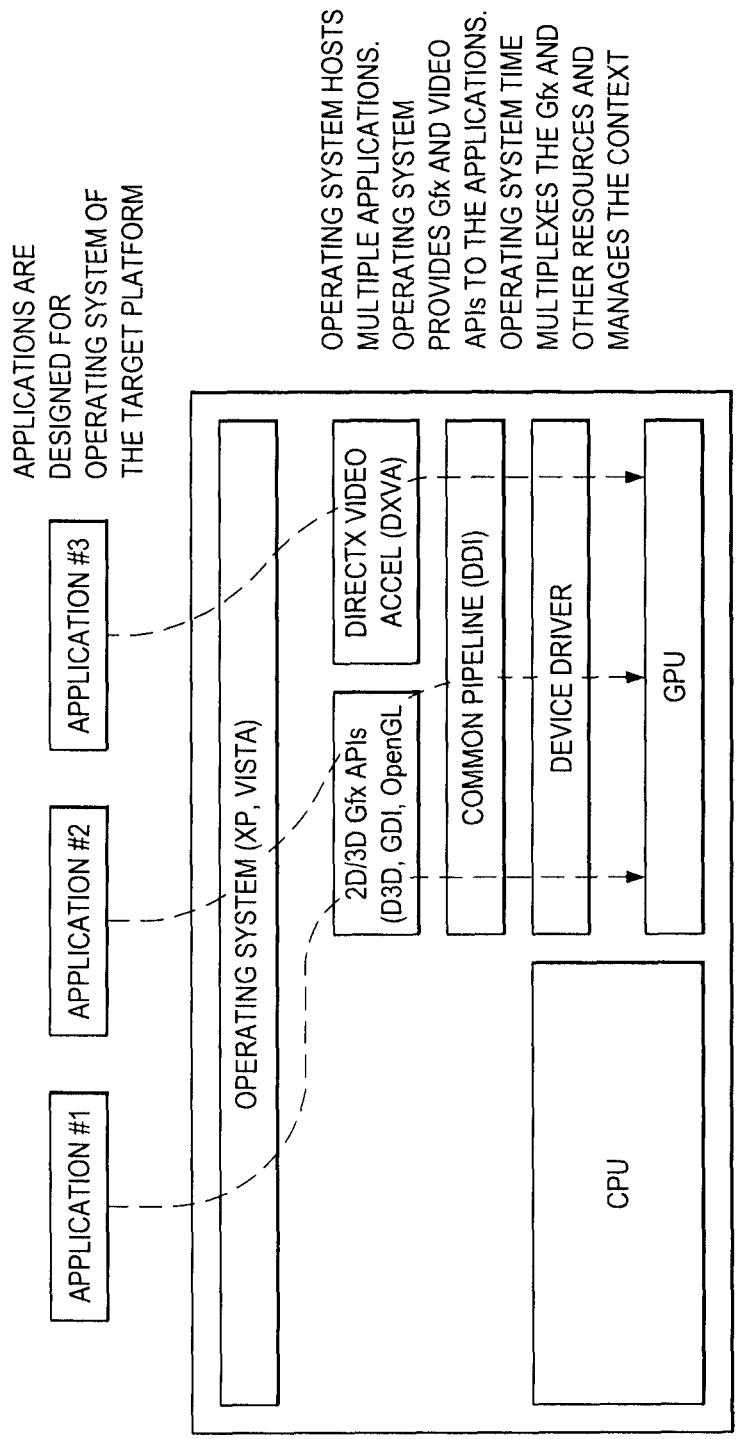
FIG. 4 illustrates a prior art embodiment of an IHS architecture including applications, an operating system and graphics hardware.

FIG. 3 illustrates a block diagram of an architecture overview for an embodiment of a hypervisor 132 having a built-in protected stream manager (PSM) 134. As shown, the virtual machines 140, 142 and 144 couple with the hardware 130 to run virtual applications. This embodiment shows how the hardware 130, hypervisor 132, PSM 134 and virtual machines 140, 142 and 144 couple with and interact with a management web server 164 and a service operating system 166. It should be readily understood how these elements couple together and interact with one another to provide virtual services for a user.

FIG. 3 also illustrates different functions of the PSM 134. In an embodiment, the PSM 134 provides a priority 170 for a virtual machine (e.g., 140, 142 and 144) for virtual machines that output protected data streams. In an embodiment, the PSM 134 provides protected stream obfuscation 172 for protected data streams, such as the secure content streams 156, 158 and/or 160. In an embodiment, the PSM 134 provides GPU 110 resource partitioning 174, such as partitioning the GPU 110 into 110A, 110B and 110C. In an embodiment, the PSM 134 provides protected stream filtering 176 to filter the data on the data streams, such as the secure content streams 156, 158 and/or 160. In an embodiment, a decoder is page mapped into the I/O 104 and a resource manager is embedded within firmware of the IHS 100. The hypervisor 132 may be part of the device firmware. The hypervisor 132 may also disallow access to the memory 108 or a secure portion of the memory 108 until the application is done using a specific resource.

In an embodiment, the PSM 134 is responsible for handling obfuscation of the content stream, supporting multiple protected streams, GPU 110 prioritization, messaging to the hypervisor 132 and processor 102 prioritization.

Obfuscation is generally referred to as blocking an access path to information. Obfuscation may be performed by scrambling or encrypting the information, but does not have to be. Thus, any system or method may be used to obfuscate or block access paths to information in the secure content streams 156, 158 and 160. The PSM 134 handles obfuscation of the content stream coming from the Blu-ray virtual machine 142 as well as, potentially, multiple protected content stream sources (e.g., virtual machine 140 and virtual machine 144) using an allocation of secure resources by allocating secure memory, (e.g., a portion of memory 108), such that only designated functions have access to such memory, and sequestering data paths 156, 158 and 160, making them accessible only to authenticated subsystems defining the specific, secure, content path. Similarly, premium content via virtual machine 140 may be obfuscated by means of allocation and isolation.

The PSM 134 supports multiple protected streams (e.g., 156, 158 and 160) wherein if a user of the IHS 100 connects additional virtual machines that output a protected stream to the host, for example, the gaming virtual machine 144, then the PSM 134 will prevent what is known as man in middle attacks by preventing the streams 156, 158 and 160 from getting exposed through secure allocation of resources, as described above, and sequestering each stream from access by those outside of the authenticated secure path. As such this will also prevent the functions from getting access to each other's data content.

The PSM 134 provides GPU 110 prioritization by having the ability to allocate the appropriate GPU 110 resources (e.g., 110A, 110B and 110C) respectively to each function (e.g., virtual machine 140, virtual machine 142 and virtual machine 144) so they do not compete for resources, such as the GPU 110 or other processor, such as the processor 102. Therefore, each virtual machine 140, 142 and 144 each have appropriate resources (e.g., the GPU 110) to render the content stream 156, 158 and 160 in play. In an embodiment, the PSM 134 allows multiple applications to "time multiplex" the GPU 110. That is, each application has full access to all of the GPU resources for a unit of time (e.g., a time slice).

To provide GPU 110 prioritization, as described above, the PSM 134 may manage the graphics content between the times slices, such as by saving the state of the GPU 110 for the time slice that just completed, and restoring the state of the GPU 110 for the slice that is about to run. In an embodiment, graphics state information may include rendering state and surface data, such as texture data or render targets.

In addition, to provide GPU 110 prioritization, as described above, the PSM 134 may manage the allocation of video memory. To accomplish this, the PSM 134 may determine which resources need to be resident on the GPU 110 local memory and page out unused resources.

To provide GPU 110 prioritization, as described above, the PSM 134 may also ensure that the application's state is isolated from the state of the other applications. There may be special resources that are not capable of time multiplexing, for example, television turners or some video decoders. In this case, the PSM 134 will be responsible for prioritizing the assigning of these resources to the applications, such as by a "first in, first out" prioritization algorithm. Also where time multiplexing is not performed, the PSM 134 may be responsible for exception handling in the situation where an application requests one of these special resources, but all resources are allocated to other tasks. This may trigger a message to the customer that resources are low and may also be accompanied by guidance on how to reprioritize the resource allocation.

In an embodiment, the PSM 134 providing appropriate messaging to the hypervisor 132 and to the user of the IHS 100 if the GPU 110 runs low on capacity and needs guidance on prioritization of the virtual machines 140, 142 and 144. The messaging may be provided to the user by pop-up notifications on the display device 112. Other types of messaging may be used for the present disclosure.

The PSM 134 may provide processor 102 prioritization by including an ability to allocate the appropriate processor 102 resources to each function (e.g., a Blu-ray virtual machine 142 and/or other premium content virtual machines 140 and/or 144) so they do not compete for resources, and each virtual machine 140, 142 and/or 144 has appropriate resources to render the stream in play.

It should be readily understood by a person having ordinary skill in the art that embodiments of the present disclosure provide an application programming interface (API) for an application to access a resource manager in a firmware enabled hypervisor (e.g., hypervisor 132). Embodiments of the present disclosure also provide a system for securing protected content streams (e.g., protected content streams 156, 158 and 160) in a firmware enabled hypervisor (e.g., hypervisor 132) by isolating the compute (e.g., processor 102), memory (e.g., main memory 108) and GPU (e.g., GPU 110) resources used by a particular function. Embodiments of the present disclosure further provide an ability to offer Blu-ray and other premium content services in the form of virtual machines (e.g., virtual machines 140, 142 and 144), insuring proper resources are available for execution of their content stream (e.g., 156, 158 and 160). Other embodiments of the present disclosure provide systems obfuscating the protected content streams (e.g., protected content streams 156, 158 and 160) by isolating the compute environment. Still other embodiments of the present disclosure provide a secure system for allocating appropriate GPU resources (e.g., GPU 110, 110A, 110B and 110C) to protected streams (e.g., protected content streams 156, 158 and 160) without impacting the performance. Moreover, other embodiments of the present disclosure provide secure systems of allocating appropriate processor 102 resources to protected steams (e.g., protected content streams 156, 158 and 160) without impacting the performance.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A protected content securing system, comprising:
   at least one processor;
   a memory;
   at least one hardware device that is coupled to the at least one processor and the memory, wherein the at least one hardware device is coupled to at least one virtual machine device including a plurality of virtual machines;
   a hypervisor located on the at least one hardware device, wherein the hypervisor includes a protected stream manager that is configured to:
   receive multiple protected video content streams including a first protected television video content stream from a first virtual machine and a second protected stored video content stream from a second virtual machine;
   allocate a first portion of the memory for the first protected television video content stream and sequester a first data path for the first protected television video content stream to the first portion of the memory that prevents unauthorized systems from accessing the first protected television content stream on the first data path;
   allocate a second portion of the memory for the second protected stored video content stream and sequester a second data path for the second protected stored video content stream to the second portion of the memory that prevents unauthorized systems from accessing the second protected stored video content stream on the second data path;
   allocate a plurality of resources of the at least one processor for each of the first protected television video content stream and the second protected stored video content stream; and
   manage the use of the plurality of resources of the at least one processor between the first virtual machine and the second virtual machine, allowing the first virtual machine to render the first protected television video content stream and the second virtual machine to render the second protected stored video content stream to play the multiple protected video content streams.

2. The system of claim 1, wherein the at least one processor includes at least one graphics processing unit (GPU).

3. The system of claim 1, wherein the hypervisor is embedded within a firmware located in the at least one hardware device.

4. The system of claim 1, wherein the protected stream manager is configured, when the at least one hardware device is coupled to the at least one virtual machine device, to:
   prioritize a first of the plurality of resources allocated to the first protected television video content stream relative to a second of the plurality of resources allocated to the second protected stored video content stream.

5. The system of claim 1, wherein the first portion of the memory allocated to the first protected television video content stream restricts access to designated functions, and wherein the second portion of the memory allocated to the second protected stored video content stream restricts access to designated functions.

6. The system of claim 1, wherein sequestering the first data path provides the first data path that is accessible only to authenticated subsystems, and wherein sequestering the second data path provides the second data path that is accessible only to authenticated subsystems.

7. The system of claim 1, wherein the plurality of resources of the at least one processor allocated to each of the first protected television video content stream and the second protected stored video content stream include the same resources of the at least one processor, and wherein the protected stream manager is configured, when the at least one hardware device is coupled to the at least one virtual machine device, to:
   time multiplex the resources of the at least one processor, causing the resources of the at least one processor are to be used with each of the first protected television video content stream and the second protected stored video content stream at different times.

8. An information handling system (IHS) comprising:
   at least one graphics processing unit (GPU);
   a memory coupled to the GPU; and
   IHS hardware coupled to the at least one GPU and the memory, wherein the IHS hardware is coupled to at least one virtual machine device;
   a hypervisor located on the IHS hardware, wherein the hypervisor includes a protected stream manager that is configured to:
      receive multiple protected video content streams including a first protected television video content stream and a second protected stored video content stream from the at least one virtual machine device;
      allocate portions of the memory for the first protected television video content stream and the second protected stored video content stream;
      sequester data paths for the first protected television video content stream and its allocated memory portion and the second protected stored video content stream and its allocated memory portion to prevent unauthorized systems accessing the first protected content stream and the second protected content stream on the data paths;
      allocate first resources of the GPU for the first protected television video content stream and second resources of the GPU for the second protected stored video content stream; and
      manage the use of the first resources of the GPU for the first virtual machine to render the first protected television video content stream and the use of the second resources of the GPU for the second virtual machine to render the second protected stored video content stream to play the multiple protected video content streams.

9. The IHS of claim 8, wherein the first resources of the at least one GPU include a first partition of a GPU and the second resources of the at least one SPU include a second partition of the GPU.

10. The IHS of claim 8, wherein the hypervisor is embedded within a firmware located in the IHS hardware.

11. The IHS of claim 8, wherein the protected stream manager is configured, when the IHS hardware is coupled to the at least one virtual machine device, to:
   prioritize the first resources allocated to the first protected television video content stream relative to the second resources allocated to the second protected stored video content stream.

12. The IHS of claim 8, wherein the portions of the memory allocated to the first protected television video content stream and the second protected stored video content stream restrict access to designated functions.

13. The IHS of claim 8, wherein the sequestered data paths provides data paths that are accessible only to authenticated subsystems.

14. The IHS of claim 8, wherein the first resources of the at least one GPU allocated to the first protected television video content stream and the second resources of the at least one GPU allocated to the second protected stored video content stream include the same resources of the at least one GPU, and wherein the protected stream manager is configured, when the IHS hardware is coupled to the at least one virtual machine device, to:
   time multiplex the resources of the at least one GPU, causing the resources of the at least one GPU to be used with each of the first protected television video content stream and the second protected stored video content stream at different times.

15. A method to secure protected content streams, comprising:
   receiving multiple protected video content streams including a first protected television video content stream from a first virtual machine and a second protected stored video content stream from a second virtual machine;
   allocating a first portion of a memory for the first protected television video content stream and sequestering a first data between for the first protected television video content stream to the first portion of the memory that prevents unauthorized systems from accessing the first protected content stream on the first data path;
   allocating a second portion of the memory for the second protected stored video content stream and sequestering a second data path for the second protected stored video content stream to the second portion of the memory that prevents unauthorized systems from accessing the second protected stored video content stream on the second data path;
   allocating a plurality of resources of at least one processor for each of the first protected television video content stream and the second protected stored video content stream; and
   managing the use of the plurality of resources of the at least one processor between the first virtual machine and the second virtual machine allowing the first virtual machine to render the first protected television video content stream and the second virtual machine to render the second protected stored video content stream to play the multiple protected video content streams.

16. The method of claim 15, further comprising:
prioritizing a first of the plurality of resources allocated to the first protected television video content stream relative to a second of the plurality of resources allocated to the second protected stored video content stream.

17. The method of claim 15, wherein the portions of the memory allocated to the first protected television video content stream and the second protected stored video content stream restrict access to designated functions.

18. The method of claim 15, wherein the sequestering the first data path provides the first data path that is accessible only to authenticated subsystems, and wherein sequestering the second data path provides the second data path that is accessible only to authenticated subsystems.

19. The method of claim 15, further comprising:
time multiplexing the plurality of resources of the at least one processor, causing the resources of the at least one processor to be used with each of the first protected television video content stream and the second protected stored video content stream at different times.

20. The method of claim 15, further comprising:
determining that the at least one processor is nearing a processing capacity and, in response, providing an alert.

21. A protected content securing system, comprising:
a hypervisor included in firmware located in hardware that is coupled to at least one virtual machine device, wherein the hypervisor receives multiple video streams including a first television video stream from a first virtual machine on the at least one virtual machine device and a second stored video stream from a second virtual machine on the at least one virtual machine device; and
a protected stream manager that obfuscates the first television video stream and the second stored video stream by allocating secure portions of a memory for each of the first television video stream and the second stored video stream and allocating secure data paths to the secure portions of the memory for each of the first television video stream and the second stored video stream that prevents unauthorized systems from accessing the first television video stream and the second stored video stream on the secure data paths, and wherein the protected stream manager to prioritizes use of a plurality of resources of a graphics processor unit (GPU) to process each of the first television video stream and the second stored video stream to render the first television video stream via the first virtual machine and render the second stored video stream via the second virtual machine to play the multiple video streams.

22. The protected stream manager of claim 21, wherein the protected stream manager is configured to;
inform a user when the GPU nears processing capacity.

* * * * *